Figure 10:
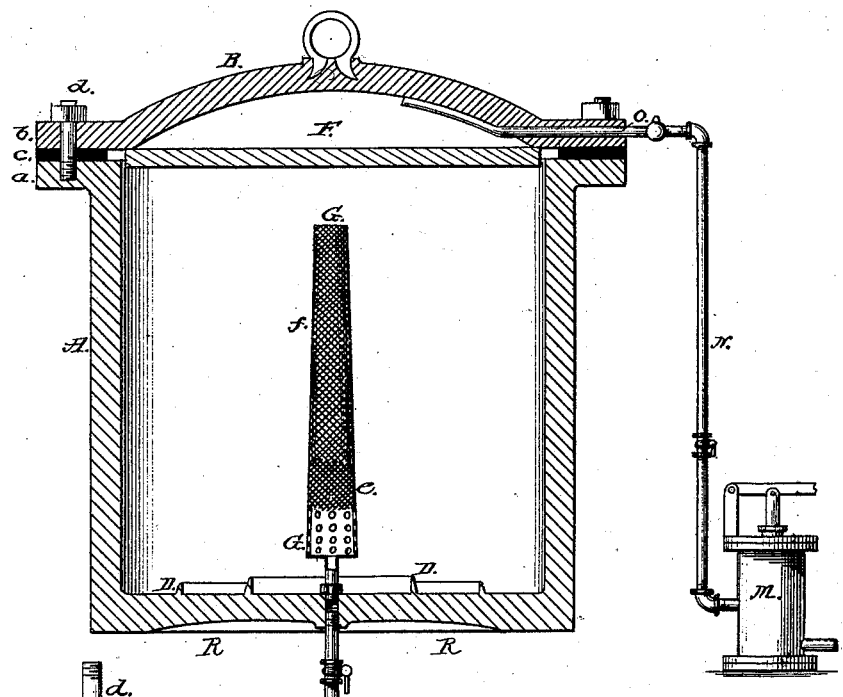

T. R. SINCLAIRE.
APPARATUS FOR FILTERING LIQUIDS.
No. 171,056. Patented Dec. 14, 1875.
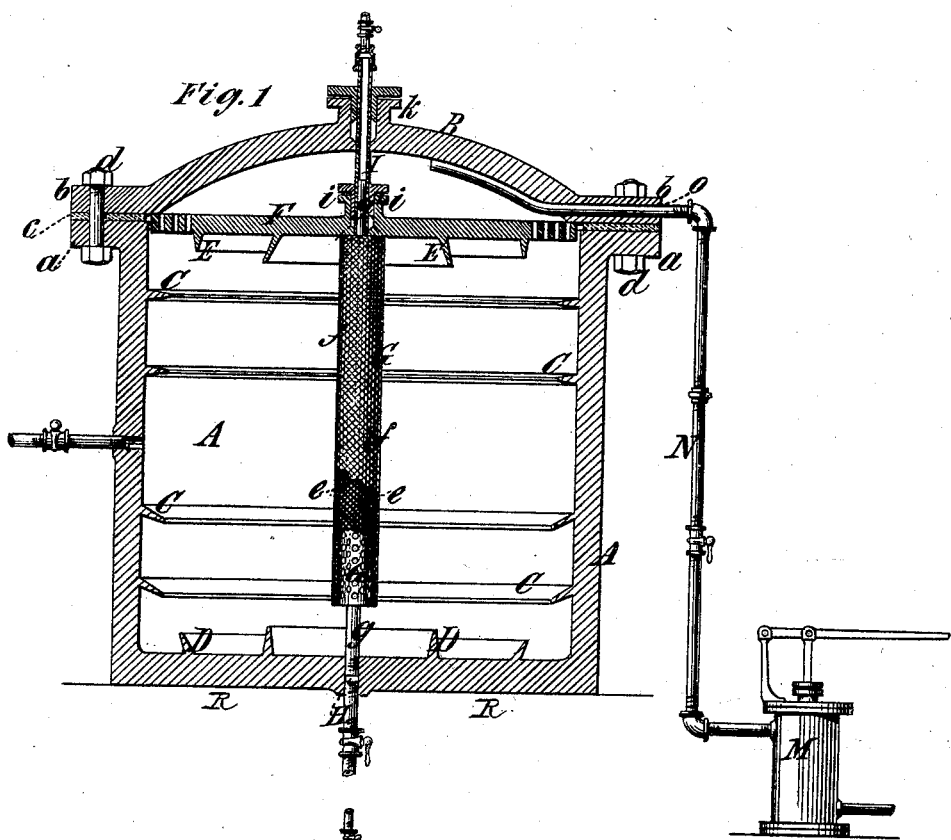
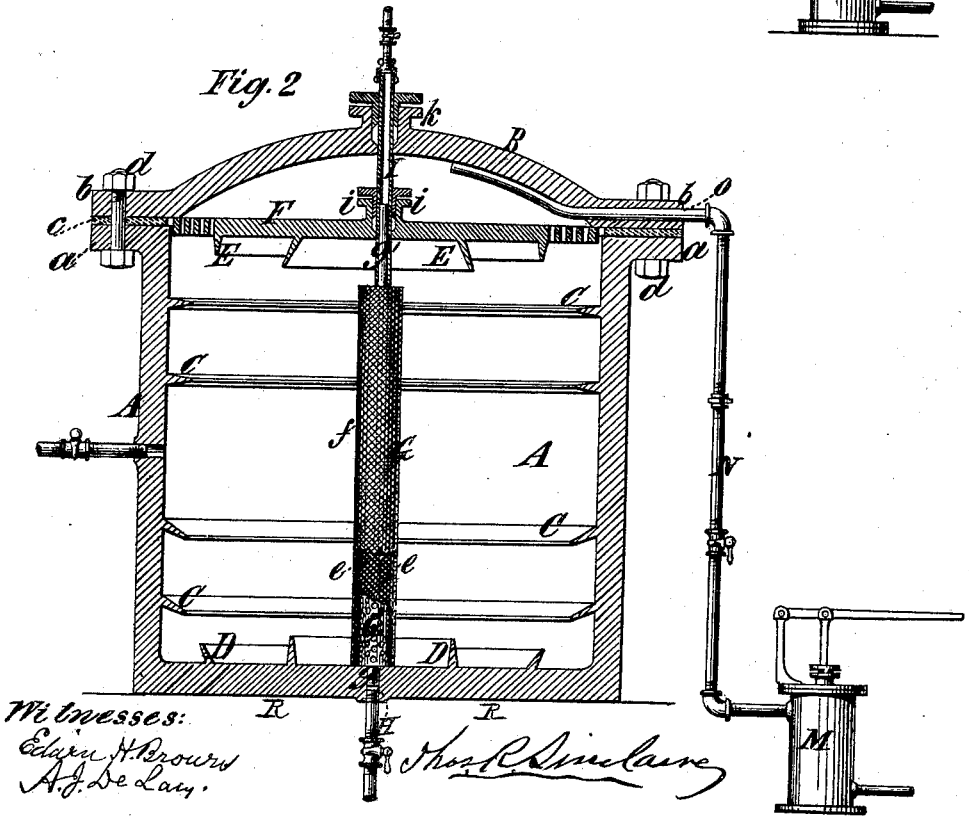

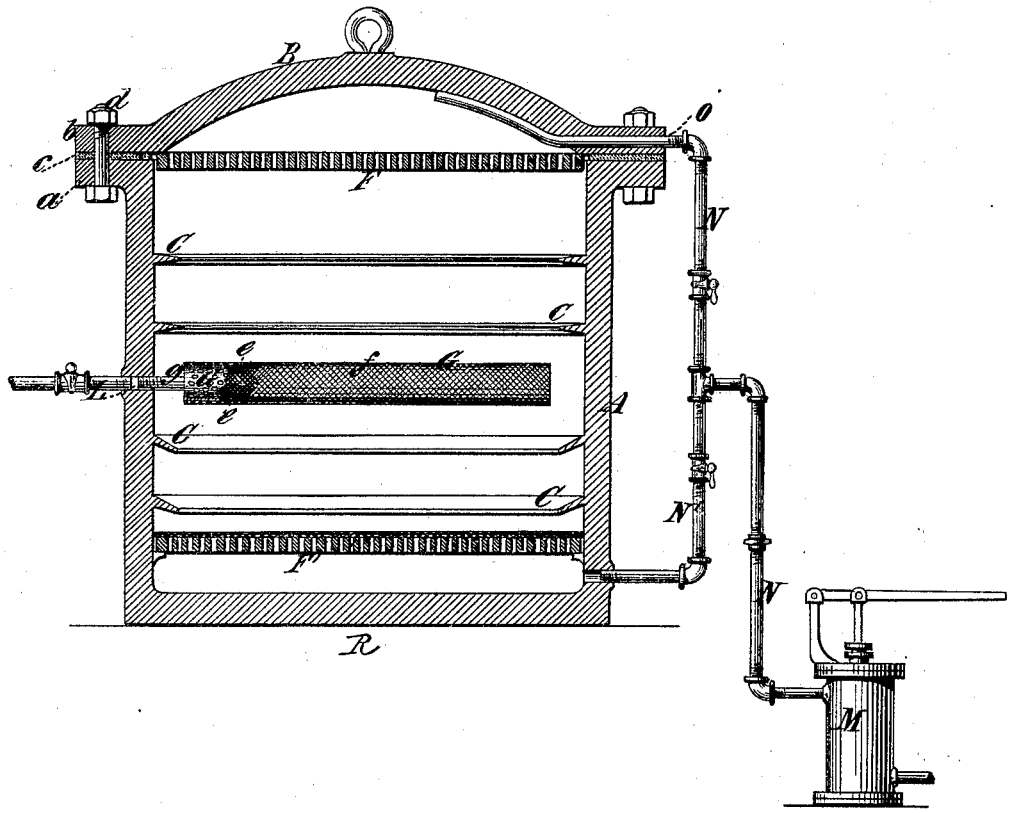

6 Sheets—Sheet 3.
T. R. SINCLAIRE.
APPARATUS FOR FILTERING LIQUIDS.
No. 171,056. Patented Dec. 14, 1875.
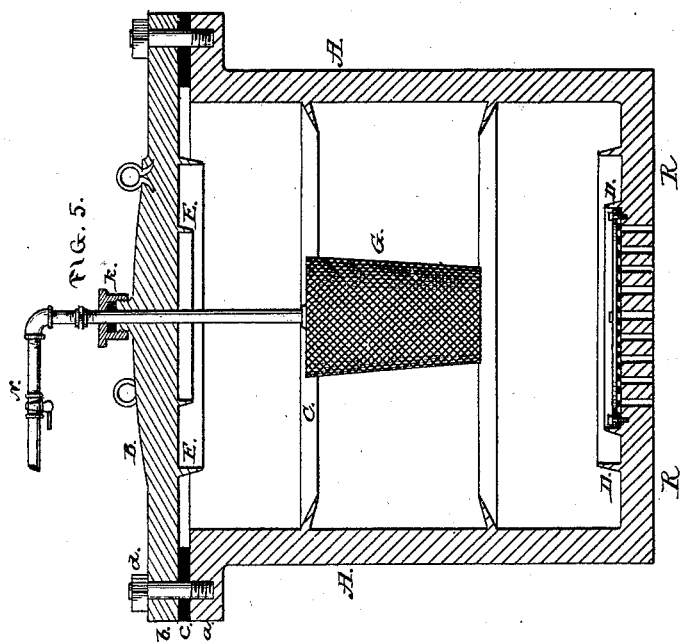
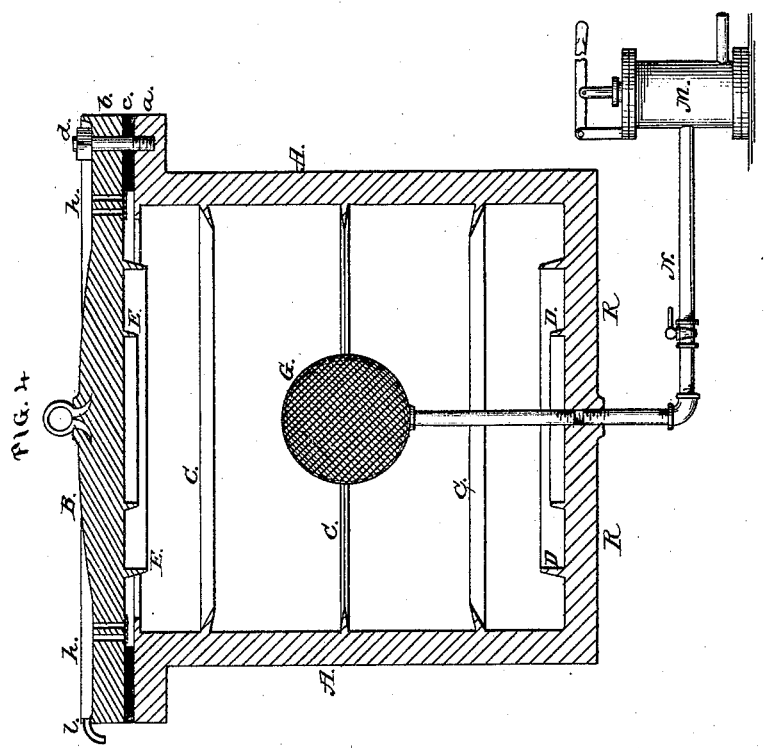

6 Sheets—Sheet 4.
T. R. SINCLAIRE.
APPARATUS FOR FILTERING LIQUIDS.
No. 171,056. Patented Dec. 14, 1875.
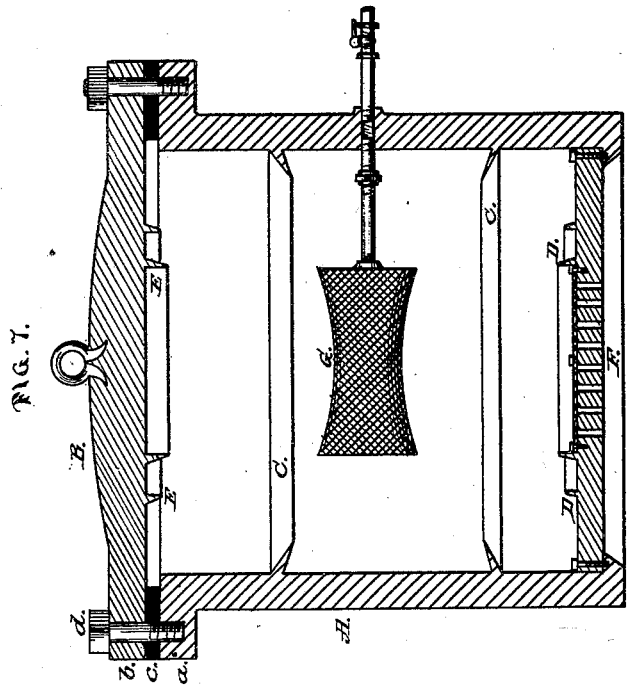
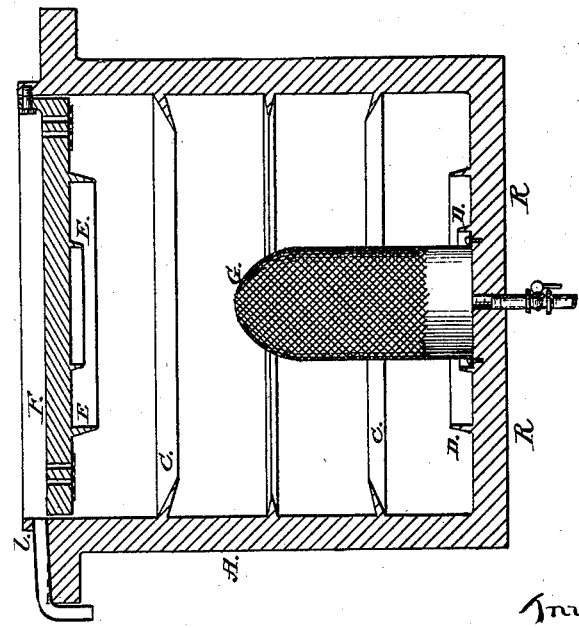

6 Sheets—Sheet 5.
T. R. SINCLAIRE.
APPARATUS FOR FILTERING LIQUIDS.
No. 171,056. Patented Dec. 14, 1875.
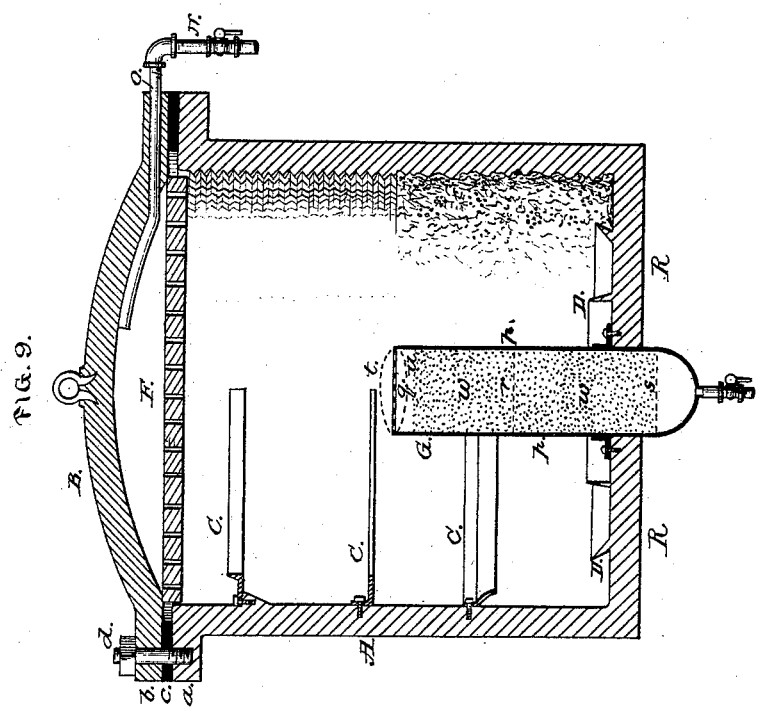
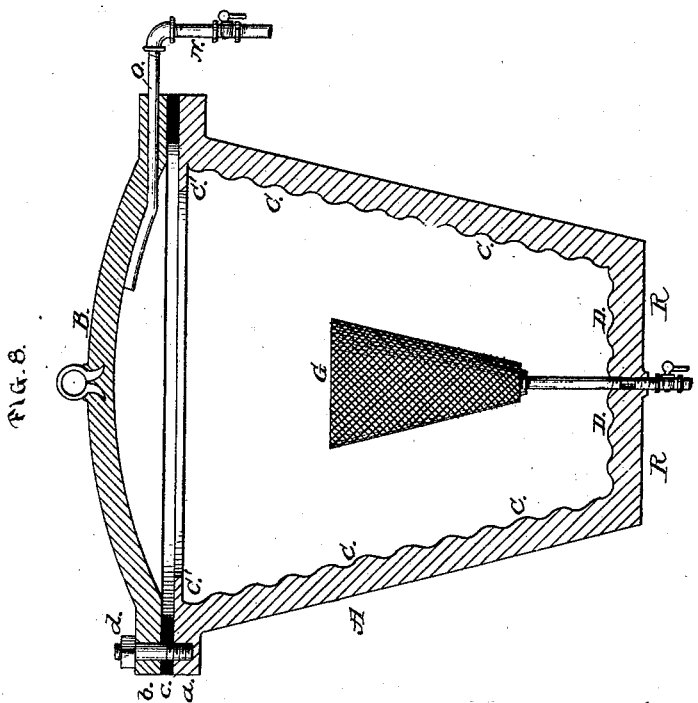

6 Sheets—Sheet 6.

T. R. SINCLAIRE.
APPARATUS FOR FILTERING LIQUIDS.

No. 171,056. Patented Dec. 14, 1875.

ATTEST.
Geo. H. Graham
Jos. L. Coombs

INVENTOR.
Thos. R. Sinclaire

UNITED STATES PATENT OFFICE.

THOMAS R. SINCLAIRE, OF BROOKLYN, NEW YORK, ASSIGNOR TO SINCLAIRE RECTIFYING-MACHINE COMPANY, OF NEW YORK CITY.

IMPROVEMENT IN APPARATUS FOR FILTERING LIQUIDS.

Specification forming part of Letters Patent No. 171,056, dated December 14, 1875; application filed May 6, 1875.

*To all whom it may concern:*

Be it known that I, THOMAS R. SINCLAIRE, of the city of Brooklyn, in the county of Kings and State of New York, have invented certain new and useful Improvements in Apparatus for Filtering Liquids; and I do hereby declare that the following is a full, clear, and exact description of the same, reference being had to the accompanying drawing, which forms a part of this specification.

This invention relates to certain improvements in an apparatus which may be used for filtering liquids by causing them to pass through the charcoal or other filtering material, in either a centripetal or centrifugal manner or direction; and it consists in certain novel arrangements of the receiver or distributer, and in certain novel combinations of parts, which will be fully hereinafter described and explained.

In the accompanying drawing, Figure 1 is a vertical central section of an apparatus illustrating my present improvements; and Figs. 2, 3, 4, 5, 6, 7, 8, 9, 10, and 11 are similar sections, showing modifications in the arrangement of the same.

A designates a vessel or casing, which is shown as cylindrical in all the figures except Fig. 8, in which it is shown as conical or tapering; but it may be of any other suitable shape or form. B, Figs. 1, 2, 3, 5, 7, 8, 9, and 10, designates a cover, which is shown as applied to the vessel A, for the purpose of producing an air-tight vessel, and in Fig. 4 it designates a cover, performing the office of a diaphragm also. In the present instance the top of the vessel and the cover are, respectively, provided with flanges *a b*, between which a suitable packing, *c*, is interposed, the flanges being secured together by bolts *d*, in a well-known manner. R, Figs. 1, 2, 3, 4, 6, 8, 9, and 10, designates the bottom of the vessel, and in Figs. 5 and 11 it designates a bottom, performing also the office of a diaphragm. C C in Figs. 1, 2, 3, 4, 5, 6, 7, 8, and 9 designate a number of ledges, deflectors, or shelves, which project inwardly from the side or vertical walls of the vessel or casing A, and in Fig. 11 they are shown as being recessed in said walls. The office of these ledges, whether the same be pliable, flexible, movable, or rigid, is to present obstructions or barriers across channels, which may be formed by the liquid under filtration between the mass or body of filtering material with which the interior of the vessel A may be packed or supplied, and the sides or vertical walls of such vessel. These deflectors, shelves, or ledges may be set at various angles or curves relatively to the sides of the vessel and to each other, and they may extend entirely around the vessel or partially around it, or may break joints with each other, as may be found desirable, and the vessel may be supplied with any suitable number of such ledges. D D designate a number of ledges, deflectors, or shelves projecting inwardly from the bottom, or the bottom diaphragm, of the vessel A; and E E, a number of deflectors, ledges, or shelves projecting inwardly from the top diaphragm or the cover B. These ledges D E may also be set at various angles or curves, and may extend in continuous or broken lines, as found expedient. Any suitable number of these ledges D or E, any or all, may be employed, their office being to prevent the forming of channels between the filtering material and its contiguous walls, and to deflect the liquid into such filtering material.

I will here remark that the ledges, deflectors, or shelves C and D, any or all, may be cast with the vessel A or be made separately, of any suitable rigid or pliable material, and attached thereto; and the same may be said of the ledges D with regard to the bottom diaphragm, and also of the ledges E with respect to the top diaphragm and cover B; and I will also remark that the said ledges or shelves C and D, any or all, may be formed by corrugating, waving, serrating, or roughening the vessel itself, and that the same may be said of the ledges D with respect to the bottom diaphragm, and also that the ledges E may be formed by corrugating, waving, serrating, or roughening the top diaphragm or cover B; but I do not limit myself to any particular form or construction of ledges, shelves, or deflectors, it being obvious that they may be constructed or formed by making V, concave, or other suitably shaped recesses in the cover, diaphragms, or walls of the vessel.

In Fig. 9 I have shown examples of detachable ledges, and also examples of different angled or curved ledges, as well as examples of a roughened wall, and also a serrated wall. In Fig. 8, at letter C', I have shown a ledge or deflector projecting from at or near the flange or top of the vessel; and in Fig. 11 I have shown examples of V and other shaped recesses, as well as an example of a concave wall, D', at the bottom of the vessel, and also an example of a modification of both a diaphragm and an end of the filtering-vessel. The plate or diaphragm F is shown in Figs. 1, 2, and 6 as being perforated or permeable around its edges outside of the outermost ledge, when it carries one or more ledges; but when no ledges are employed, as in Figs. 3 and 9, it may be wholly or partially perforated, as found desirable; or, indeed, if the diameter of the plate or diaphragm F be sufficiently less than the internal diameter of the vessel A to allow the passage of liquid between it and the vessel, then all of the perforations may be dispensed with and an impervious diaphragm used, as shown in Fig. 10; or the diaphragm may be impervious and liquid-tight where it joins the vessel, when provision is otherwise made for the passage of liquid through it, as shown in Fig. 7; or, indeed, the vessel may be used without any diaphragm, as shown in Fig. 8.

Figure 11:
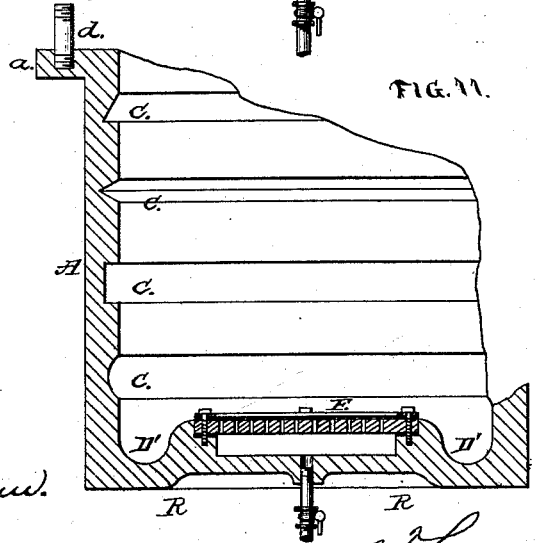

In Fig. 11 I have shown the bottom diaphragm as provided with wire-cloth and canvas, they being held in place by a flat ring and bolts, though any other suitable means for doing the same may be used, the ring, as shown, acting as a ledge, and any of the diaphragms or perforations may be thus provided, as deemed expedient.

G designates that part of the apparatus which I term the "receiver" or "distributer," because of its functions, its office being in some cases to receive the filtered liquid from the mass of filtering material surrounding it, and in other cases to distribute the liquid to be filtered into the mass or body of filtering material surrounding it. In the present instance the receiver or distributer is a perforated or reticulated tube, device, or cylinder, which I have shown as provided with a wire-gauze covering, e, and a jacket, f, of fibrous material; and I have also shown the said receiver or distributer as being reversible, it being illustrated in Fig. 1 with its lower end elevated from the bottom of the vessel A, its upper end approaching near to, or abutting against, the under side of the plate or diaphragm F, and in Fig. 2 with its lower end as approaching near to or resting upon the bottom of the vessel A, its upper end in this case being sufficiently below the diaphragm F to leave an intervening space. But I will here remark that the said receiver or distributer may be of such length as to extend to or nearly to both the bottom of the vessel and the plate or diaphragm F, or of such length as to leave a greater or less space intervening between its respective ends and the diaphragm or plate F and bottom of the vessel; and I will also remark that the receiver or distributer may be made or composed wholly or partially of any suitable permeable, perforated, reticulated, or porous material, and it may also be of any suitable form or dimensions.

I have shown it in Figs. 1 and 2 as provided at its lower end with a tube, g, fitting into or communicating with an orifice or pipe, H, in the bottom of the vessel, and at its upper end with a tube, g', fitting into or communicating with a pipe, I, which said pipe I extends through a suitable packing-box, i, in the diaphragm or plate F, and through another suitable packing-box, k, in the cover B, when the latter is used upon the vessel A.

I will here state that the pipe I may be dispensed with, and the tube g' extended outside the vessel; or that both the pipe I and tube g' may be dispensed with altogether; or that, if desired, the upper end of the receiver or distributer may be made sufficiently long to extend outside the vessel; and that the tube g may be dispensed with, and the lower end of the receiver or distributer made so as to extend through the bottom of the vessel; or that the tube g may be dispened with altogether, as well as the pipe or orifice H, and communication be established between the exterior of the vessel and the receiver or distributer through or at the top of the latter, or some other portion thereof, in all of which cases liquid-tight joints may be made wherever the same may be necessary.

I have shown an example of the receiver or distributer extending through the vessel in Fig. 9; and I will also state that the receiver or distributer may be so constructed and arranged that but one end shall communicate with the exterior of the vessel, in which case all the ledges or shelves, except those surrounding the communicating end or tube of the receiver or distributer, may be dispensed with, and the other end of the receiver or distributer would be preferably surrounded by the charcoal or other filtering material, as shown in Fig. 10.

I will also remark that, in such case, the perforations in the side walls of the receiver or distributer may be omitted, if desired, as shown at p; and the end or end plate of the receiver or distributer may be perforated or permeable; or a perforated or permeable plate, or other permeable obstruction, may extend across its interior at any suitable point between its mouth and outlet, as shown at q r s; and such obstructions or plates may be convex or concave, as shown at *t u;* and such receiver or distributer may be packed with filtering material *w*, if desired, all as shown in Fig. 9.

I will also remark that among the various ways of arranging the receiver or distributer I have illustrated one in Fig. 3, where it is shown as arranged horizontally within the vessel A, and as parallel with the direction in which the ledges C run; and in this case I have shown an orifice or pipe, L, extending through one of the side or vertical walls of the vessel, and into this orifice or pipe the tube (*g* or *g'*) at one end of the receiver or distributer may be secured; or the receiver or distributer may be otherwise caused to communicate with the exterior of the vessel, or to project through the walls thereof, in which case no tube need be employed at the other end, and the ledges D and E, any or all, may be dispensed with.

I will also remark that although I have referred to but one receiver or distributer as being employed in the vessel A, two or more may be used, and they may also be constructed, arranged, and have a mode of operation substantially as herein specified.

Although I have shown and described the device called the "receiver" or "distributer" under several forms, sizes, materials, and constructions, yet it is of course obvious that the said device, in form, size, material, and construction, may be almost indefinitely varied, while its office under all such changes would be practically the same.

M designates a force-pump or forcing apparatus, to which is connected a pipe, N, which is shown as communicating with the interior of the vessel through an orifice, *o*, when the apparatus is to be used for filtering liquid by causing it, under pressure, to percolate through the filtering material inwardly toward the receiver G, from whence it may be discharged through its proper outlet. In this case the vessel A should be provided with its air-tight cover B.

The pipe N, however, may be attached to, or caused to communicate with, the receiver or distributer G when the apparatus is to be used for filtering liquid, by causing it to percolate through the filtering material in a direction away from the distributer G.

In this case the cover B, as well as the bottom of the vessel, may be dispensed with and diaphragms used instead.

Although I have shown the force-pump M, yet it is obvious that an exhaust-pump or elevated tank or reservoir, or any other suitable forcing apparatus or pressure-producing medium, may be employed for driving the liquid through the filtering material, as found expedient.

In Fig. 4 I have shown the pipe N as communicating through the bottom of the vessel with the interior of the receiver or distributer for filtering in an outward or centrifugal manner, and the cover of the vessel so constructed and arranged as to perform both the office of a cover and a diaphragm, and the liquid as escaping at or near its edges, with a ring or guard, *h*, around such cover, and an orifice or pipe, *l*, through the same, for the discharge of the liquid; and in Fig. 5 I have shown the pipe N as communicating through the cover of the vessel with the interior of the receiver or distributer, for filtering in an outward or centrifugal manner, and the bottom of the vessel so constructed and arranged as to perform both the office of a bottom and a diaphragm, the liquid in this case escaping at or near its center through perforations.

It is evident that instead of the cover or the bottom being so constructed and arranged as to also perform the office of a diaphragm, the top or the bottom diaphragm may be so constructed and arranged as to also perform the office of a cover or bottom, respectively, as illustrated in Figs. 6 and 7; and it is obvious that in all such cases the filtering-vessel would be air-tight or liquid-tight, or equivalent thereto, since the liquid could be forced through the filtering material under any desired pressure before reaching its outlet in a rectified or clarified state.

In Fig. 3 I have shown the force-pump M as provided with a branch pipe, N', which enters a space at the lower portion of the vessel, divided off by a plate or diaphragm, F', similar to the diaphragm F at the upper portion of the vessel.

In this case it will be seen that I can force liquid either into or out of the vessel at both ends at the same time, thereby very materially expediting the operation of filtering or clarifying the liquid.

I will remark that these diaphragms F and F' may, if desired, be made or constructed in a similar manner to those shown in other figures of the drawing.

It is, of course, obvious that the pipes employed in the apparatus may be provided with cocks or valves for opening and shutting off communication in a well-known manner, and that the apparatus or its appendages may be provided with the necessary gage and check or safety valves.

What I claim, and desire to secure by Letters Patent, is—

1. The combination of the following elements: a filtering-vessel, A, with or without the cover B, and with or without the forcing apparatus M, the receiver or distributer G, and the obstructing ledges, deflectors, or shelves C D E, any or all, substantially as herein specified.

2. The combination, with a filtering-vessel, of a cover or top diaphragm provided with ledges, shelves, or deflectors, substantially as and for the purpose specified.

3. The combination of a filtering-vessel, A, with or without the cover B, and with or without the bottom R, either or both, the obstructing shelves or ledges C, the receiver or distributer G, when the latter is arranged substantially parallel with the said obstructing-ledges C, all with or without a forcing apparatus, M, substantially as herein specified.

4. The combination of the following elements: a filtering-vessel constructed to filter liquid under pressure, the receiver G, the obstructing shelves or ledges C, the diaphragms F and F', all with or without the forcing apparatus M, substantially as and for the purpose herein specified.

5. The combination of the following elements: an air-tight or hermetically sealed or closed filtering-vessel, a receiver or distributer, bottom ledges, shelves, or deflectors, an induction pipe or orifice, a diaphragm, and a forcing apparatus, substantially as shown and specified.

THOS. R. SINCLAIRE.

Witnesses:
EDWIN H. BROWN,
A. J. DE LACY.